United States Patent [19]

Reinke

[11] E Re. 28,727

[45] Reissued Mar. 2, 1976

[54] CIRCULAR IRRIGATION SYSTEM WITH WORM GEAR DRIVE

[76] Inventor: Richard F. Reinke, P.O. Box 480, Deshler, Nebr. 68340

[22] Filed: Nov. 29, 1973

[21] Appl. No.: 419,928

Related U.S. Patent Documents

Reissue of:

[64] Patent No.: 3,623,662
Issued: Nov. 30, 1971
Appl. No.: 884,117
Filed: Dec. 11, 1969

[52] U.S. Cl. ..... 239/177; 137/344; 239/213
[51] Int. Cl.[2] ..... B05B 3/12
[58] Field of Search ..... 239/177, 212, 213; 137/344; 74/126

[56] References Cited

UNITED STATES PATENTS

| | | | |
|---|---|---|---|
| 3,255,968 | 6/1966 | Stafford | 239/212 |
| 3,352,493 | 11/1967 | Curtis | 239/212 X |
| 3,353,751 | 11/1967 | Dowd | 239/212 X |
| 3,370,606 | 2/1968 | Kane | 239/212 X |
| 3,512,548 | 5/1970 | Miller | 239/213 X |

FOREIGN PATENTS OR APPLICATIONS

| | | |
|---|---|---|
| 291,021 | 5/1969 | Australia |

*Primary Examiner*—Evon C. Blunk
*Assistant Examiner*—Michael Mar
*Attorney, Agent, or Firm*—Clarence A. O'Brien; Harvey B. Jacobson

[57] ABSTRACT

A worm gear drive assembly for driving the wheeled support assemblies for an elongated irrigation pipe including a motor having an output controlled in response to bending or deflection of the pipe and a forwardly and rearwardly extending shaft with a drive worm gear on each end thereof engaged with a worm wheel for driving the supporting wheels. Each supporting wheel is connected to the frame structure in such a manner that it may be oriented for driving the pipe in a direction transverse to the longitudinal axis thereof or in a position perpendicular thereto to enable the irrigation pipe to be towed or pulled in a direction parallel to its longitudinal axis to facilitate movement from one area to be irrigated to another.

11 Claims, 7 Drawing Figures

Richard F. Reinke
INVENTOR

BY Clarence A. O'Brien and Harvey B. Jacobson
Attorneys

Richard F. Reinke
INVENTOR.

BY Clarence A. O'Brien and Harvey B. Jacobson
Attorneys

CIRCULAR IRRIGATION SYSTEM WITH WORM GEAR DRIVE

Matter enclosed in heavy brackets [ ] appears in the original patent but forms no part of this reissue specification; matter printed in italics indicates the additions made by reissue.

This application discloses improvements in the drive mechanism for the supporting assemblies of an irrigation pipe as disclosed in copending application Ser. No. 792,013, filed Jan. 17, 1969, *now U.S. Pat. No. 3,608,826* for Electrically Driven Circular Irrigation System.

The present invention generally relates to drive supporting assembly for an elevated irrigation pipe for supporting and driving the irrigation pipe for movement in a direction transverse of the longitudinal axis of the irrigation pipe and more particularly includes a worm gear drive for the supporting wheels on the supporting assembly.

An object of the present invention is to provide a worm gear drive for the supporting wheels at the forward and rearward ends of a supporting frame or assembly for an elongated irrigation pipe in which the pipe is supported by a plurality of similar support assemblies with each support assembly including a drive motor having a forward and rearward output shaft with the forward and rearward ends of the output shaft having a worm shaft thereon in meshing engagement with a worm wheel carried by the hub of the wheel to rotate the wheel thus driving the support assembly.

Another object of the invention is to provide a support assembly in which the wheels at the opposite ends thereof are orientated with the rotational axes thereof in parallel relation to each other and generally parallel to the longitudinal axis of the irrigation pipe supported thereby for moving the pipe in a direction transverse to its longitudinal axis with the wheels also being positioned for rotation about a substantially coincidental rotational axis in perpendicular relation to the longitudinal axis of the pipe so that the irrigation pipe may be towed longitudinally from one area to another such as from one field to another through a relatively narrow gate or along a relatively narrow road or the like thus facilitating movement of the irrigation system from one area to another.

A further important object of the present invention is to provide a support assembly for irrigation pipes having a worm gear drive to provide positive control of the driven wheels so that they will not roll freely forward in the event of traversing uneven terrain thereby providing positive control of the driving speed of the wheels at all times.

Another object of the present invention resides in its simplicity of construction, dependability and relatively inexpensive manufacturing and maintenance cost.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1:
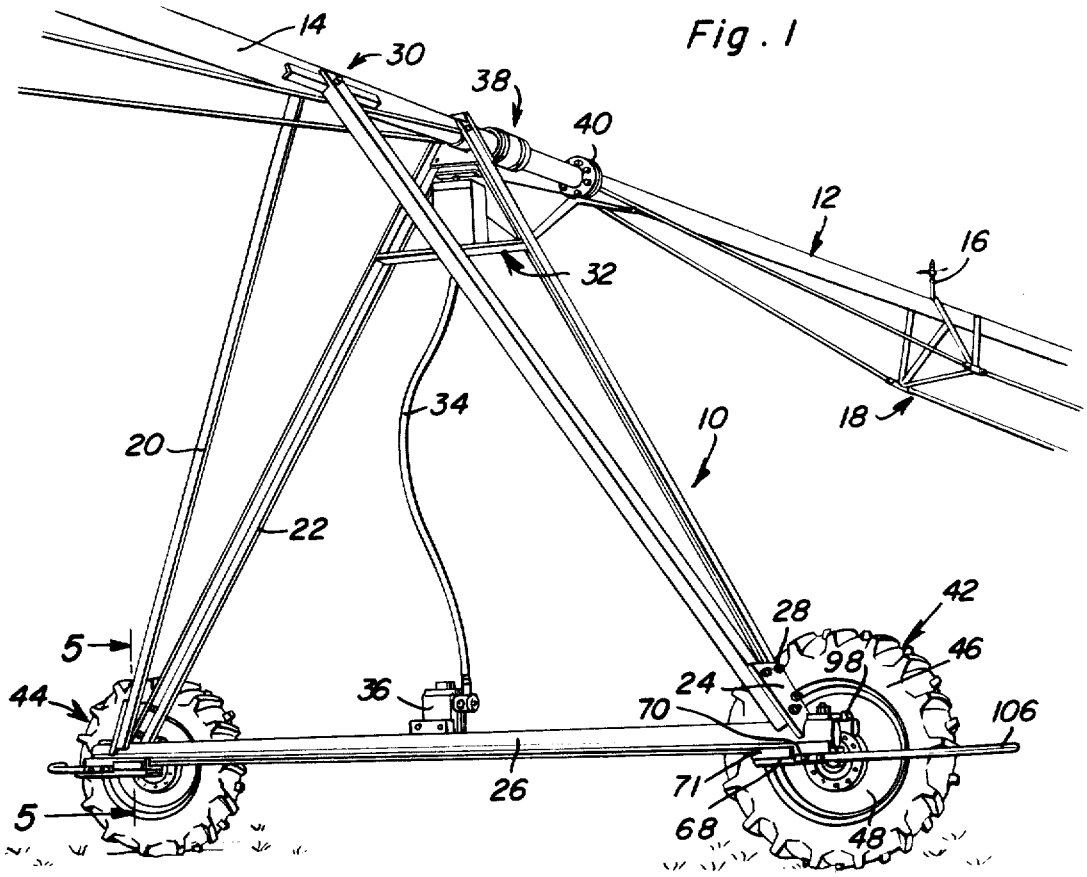
FIG. 1 is a perspective view of one of the supportin assemblies for the irrigation pipe illustrating the orier tation of the components thereof.

Referring now specifically to the drawings, the sup porting assembly for the irrigation system is generall designated by the numeral 10 and the irrigation pipe o boom is generally designated by the numeral 12 wit the structure of the irrigation pipe or boom being th same as that disclosed in Ser. No. 792,013 mentione previously. The irrigation boom or pipe is in the form o an elongated tubular pipe 14 having a plurality of sprinklers 16 mounted longitudinally therealong togethe with bracing and supporting truss assemblies generally designated by the numeral 18 all of which are the same as disclosed in Ser. No. 792,013. The support assembly 10 includes a generally A-shaped construction formed by a pair of downwardly converging frame members 20 and 22 which extend both forwardly and rearwardly from the pipe 14 as illustrated in FIG. 1. The lower ends of the members 20 and 22 are interconnected by a rigid plate 24 which in turn is rigidly fixed to the horizontally disposed tubular frame member 26 as by welding or the like with the plate 24 being disposed at the same angle as the members 20 and 22 and secured rigidly thereto by bolt-type fasteners 28 or the like. The upper ends of the members 20 and 22 are secured to the pipe 14 by suitable bracket structures generally designated by the numeral 30 and the support members 22 have a control system 32 having a conductor 34 depending therefrom for operating the electric drive motor 36. All of this construction is the same as the structure disclosed in Ser. No. 792,013 including the flexible coupling 38 in the pipe 14 and the flanged coupling 40 therein provided with an O-ring seal in which both of the flanges of the flange coupling coupling 40 have a groove receiving an O-ring seal. The control system for controlling the operation of the electric motor in response to deflection of adjacent pipe sections about an axis defined by a specific construction of the flexible coupling 38 is the same as and specifically disclosed in Ser. No. 792,013.

The improvement disclosed in this application is directed toward the drive connection between the electric motor and a pair of supporting wheels 42 and 44 which are located at the opposite ends of the support frame member 26. Each wheel assembly 42 and 44 includes a pneumatically inflated tire 46 supported on a conventional wheel rim 48 secured in place on a hub 50 by lug bolts 52 to enable conventional vehicular wheels to be employed.

The hub 50 includes a tubular extension 54 supporting spaced bearing assemblies 56 which engage the tapered spindle shaft 58 to journal the hub 50 from the spindle 58 in a well known and conventional manner. The bearing assemblies 56 are retained in position by a retaining nut 60 and a grease cap or seal 62 is attached to the tubular extension 54 to retain lubrication within the hub assembly. This structure is substantially conventional in vehicular structures in that the stationary spindle 58 rotatably journals the hub 50 and the wheel assembly for rotation about the axis of the spindle 58.

Figure 5:
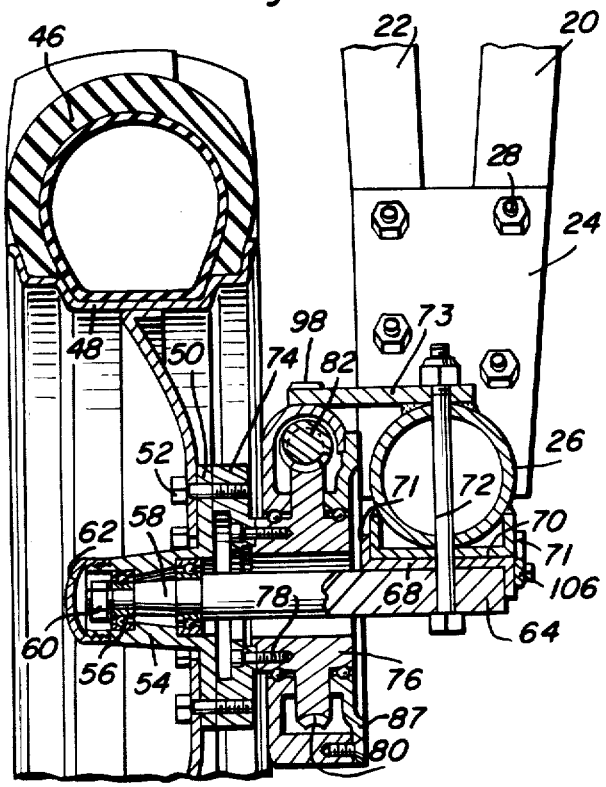
FIG. 5 is a detail sectional view, on an enlarged scale taken substantially upon a plane passing along sectio line 5—5 of FIG. 1 illustrating the structure of th wheel and worm gear drive associated therewith.
Figure 7:
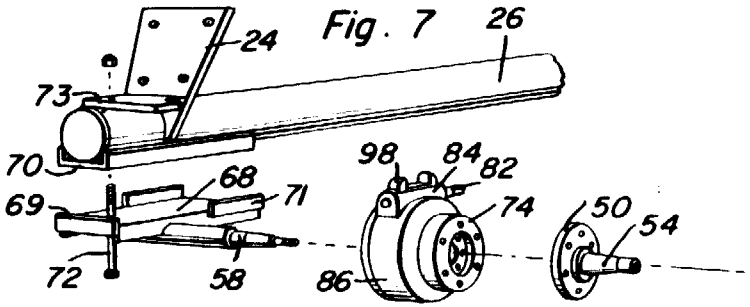
FIG. 7 is an exploded group perspective view of th wheel-mounting assembly.
Figure 4:
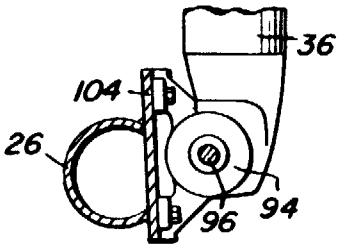
FIG. 4 is a detailed sectional view taken substantiall upon a plane passing along section line 4—4 of FIG. . illustrating further structural details of the drive mech anism.

The spindle shaft 58 extends inwardly into an attaching end portion 64 which extends under a channel-shaped plate 68 being welded thereto as illustrated in FIGS. 5 and 7. The channel-shaped member 68 has depending flanges along each side edge thereof and an upstanding end lug 69 and upstanding side lugs 71 telescoped over and engaged with a channel-shaped plate 70 secured to the frame member 26 as by welding or the like. A through-bolt 72 extends through the channel-shaped member 68, the channel-shaped member 70 as well as the frame member 26 and a torque plate 73 welded to the frame member 26 thus securing these components in rigid relation with the spindle or shaft 58 secured in perpendicular relation to the longitudinal axis of the frame member 26.

Attached to the inner surface of the hub 50 is an adapter plate 74 which is secured to the hub by the lug bolts 52 and which has a worm wheel 76 secured to the inner surface thereof by suitable countersunk bolts 78 or the like so that the worm wheel 76 adapter plate 74, hub 50, wheel 48 and pneumatic tire 46 will all rotate together with the periphery of the worm wheel [46] *76* having the usual worm wheel teeth 80 formed thereon.

Figure 2:
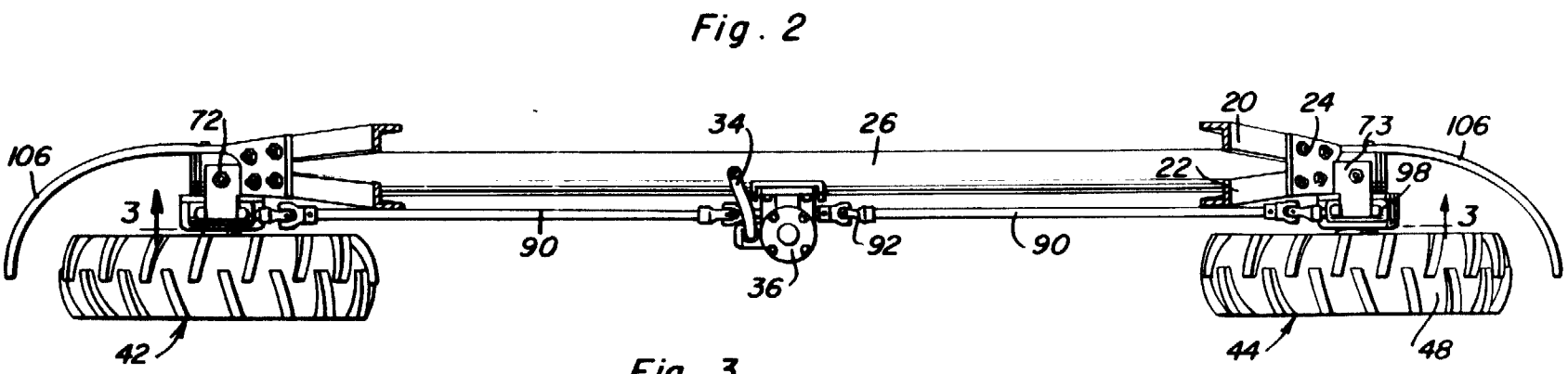
FIG. 2 is a plan view of the supporting assembly c the present invention illustrating the drive motor, ou put shaft extending forwardly and rearwardly there from in the position of a driving wheel when they ar drivingly supporting the irrigation pipe.
Figure 3:
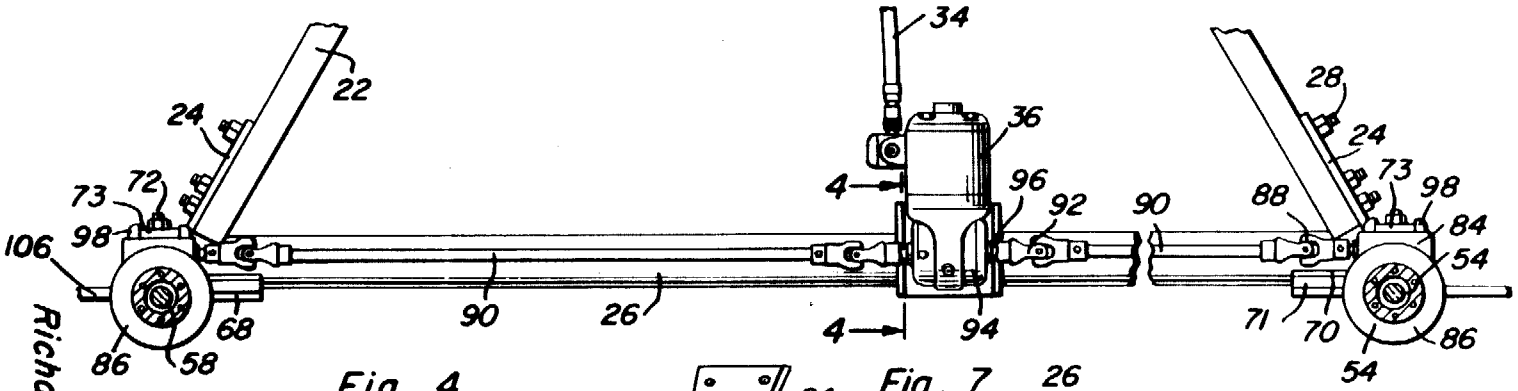
FIG. 3 is a longitudinal, vertical sectional view take substantially upon a plane passing along section lin 3—3 of FIG. 2 illustrating further structural details o the invention.

In meshing engagement with the worm wheel 76 is a drive worm shaft or gear 82 engaging the upper edge of the worm wheel 76 with the rotational axis of the worm gear 82 being perpendicular to the rotational axis of the worm wheel 76 in a well known and conventional manner. The worm gear or pinion 82 is journalled in an upward extension 84 of an annular housing 86 which also journals the worm wheel and which includes a removable side plate 87 secured in place by suitable fastening bolts. One end of the worm gear projects from the housing extension 84 and is provided with a universal coupling 88 thereon. A drive shaft 90 is connected to the universal coupling 88 adjacent the worm wheel housing 86 and the inner end of the drive shaft 90 is provided with a universal coupling 92 thereon. As illustrated in FIG. 2, the electric motor 36 is substantially disposed centrally of the frame member 26 with the drive shaft structure being identical toward both drive wheels. The electric motor 36 is provided with a reduction gear assembly 94 thereon having forwardly and rearwardly extending output shafts 96 connected with the universal couplings 92 to enable driving rotation to be imparted to the shafts 90 at the same speed for rotating the wheels 42 and 44 at the same rotational speed.

The upper end of the extension 84 on the housing 86 is engaged with the torque plate 73 which extends into overlying relation thereto by a pair of upstanding lugs

98 on housing extension 84. Thus, the through-bolt 72 secures the housing 86 and extension 84 in place with the lugs on the housing transmitting torque to the torque plate 73 and the frame member 26.

The electric motor and its reduction gear 94 may be supported from a vertical plate 104 rigidly secured to the frame member 26 which may be notched out for receiving the plate 104 which may be welded in position thereon. Also, a forwardly extending and curved guard rod 106 is provided for each of the wheels with the rod being secured to the inner edge of the channel-shaped member 68 by any suitable fastening structure or the like.

Figure 6:
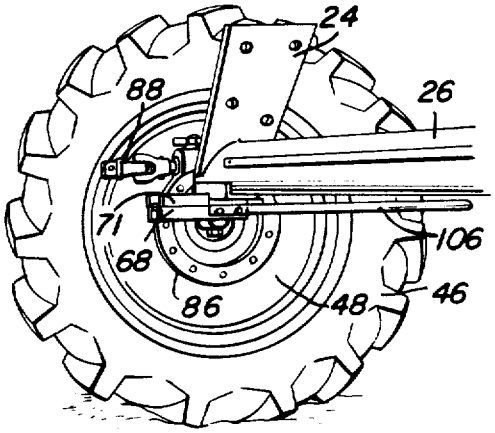
FIG. 6 is an elevational view illustrating the position ing of the supporting wheel perpendicular to the end o the support assembly to support the irrigation pipe fo movement axially along its longitudinal axis.

The plate 73 is rigidly fixed between the pair of lugs 98 on the housing extension 84 and serves as a torque plate for preventing the housing 86 and its extension 84 as well as the worm shaft 82 from rotating due to the torque exerted on the wheel. When it is desired to tow the irrigation pipe from one field to another, it is only necessary to loosen or remove the bolt 72 sufficient to enable the lugs 69 and 71 to pass under member 70 to enable pivoting of the spindle 58 and its associated structure including the worm wheel, worm pinion and housing therefor to a position whereby the spindle 58 is parallel with the longitudinal axis of the frame member 26. The bolt 72 is then tightened with member 70 disposed between lug 69 and the inner end edges of lugs 71 thus providing rigid lock for the spindle 58 in both of its positions. The universal coupling [86] *88* is detached from the drive shaft 90 prior to such movement. FIG. 6 illustrates the towed position and in this position, all of the supporting wheels 42 and 44 may be oriented with their axis of rotation being perpendicular to the longitudinal axis of the pipe 14 so that the pipe 14 may then be towed in a direction parallel with this longitudinal axis thus enabling the irrigation system to be moved from one field to another through a gate opening in a fence, along a relatively narrow road or the like without disassembly and reassembly of the irrigation pipe. When the wheel is in the position of FIG. 6, the worm wheel housing may rotate with the wheel which enables the worm pinion 82 to rotate with the worm wheel 76. If desired, the drive shaft components 90 may be telescopic or detachably connected to the universal couplings in any suitable manner and if desired, the universal coupling 88 may be detached from the worm wheel 82 to eliminate any possible damage thereto when the wheel has been oriented in the position of FIG. 6.

Any suitable bearing support structure may be provided for the wheel with the structure illustrated enabling conventional vehicular components to be employed thereby enabling the use of conventional and commercially available components to retain the cost of the device as low as possible.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

I claim:

1. In an irrigation system having a boom movable over a relatively large land area and including an elongated pipe receiving water for discharge through a plurality of sprinkler heads, that improvement comprises a plurality of support assemblies for the boom, each support assembly including an elongated frame member generally in perpendicular relation to the boom, a wheel journalled at each end of the elongated frame member for engaging the ground surface, a drive motor supported from the frame member, and a driving connection between said motor and [each of] said wheels for driving the wheels and propelling the support assembly thus propelling the elongated boom, said drive connection including a worm pinion and worm wheel to provide positive driving connection between the motor and wheels to prevent free wheeling of the wheels in the event of traversal of a downgrade, each wheel including a spindle, means connecting the spindle to the frame member, a wheel hub journalled on said spindle, a wheel [and pneumatic tire] secured to the hub, said worm wheel being secured to said hub for rotation therewith *about a common axis* whereby rotation of the worm wheel will drivingly rotate the wheel, *said means connecting the spindle to the frame means including means enabling the spindle to pivot approximately 90° whereby the axes of rotation of the wheels may be parallel to the axis of the boom or perpendicular thereto, and means disengaging the drive connection between the motor and wheels to enable the boom to be towed.*

2. The structure as defined in claim 1 wherein said driving connection includes an elongated drive shaft extending from the motor, and extending toward each of the wheels, a worm pinion engaged with each worm wheel and drivingly connected to the outer ends of said shaft.

3. The structure as defined in claim 2 wherein said worm pinions are detachably connected to the drive shaft with the worm pinion and worm wheel being disposed in a housing, means connecting the housing and the frame member to prevent rotation of the housing and enable torque to be exerted on the worm wheel and wheel connected therewith for driving the wheel.

4. The structure as defined in claim 3 wherein said means connecting the spindle to the frame member includes releasable fastening means to retain the spindle in a position substantially perpendicular to the frame member for rotation of the wheels about axes substantially parallel to the longitudinal axis of the elongated boom and orientation of the spindle in a transport position for orientating the wheels in a transport position having rotational axes substantially perpendicular to the longitudinal axis of the elongated boom thereby enabling the elongated boom to be towed axially when all of the wheels on all of the supporting assemblies have been oriented in the transport position thereby enabling the irrigation system to be moved from one area being irrigated to another without disassembly and reassembly of the components of the irrigation system.

5. The structure as defined in claim 4 together with a curved guard rod extending outwardly from means connecting the spindle to the frame member and curving in front of the wheel to protect the wheel and deflect crops from out of the path of the wheel.

6. The structure as defined in claim 4 wherein the detachable connection between the drive shaft and worm pinion is automatically disconnected when the means connecting the housing and frame member is disconnected and the wheel is disposed in transport position to enable free wheeling of the wheel and rotation of the housing therewith.

7. In an irrigation system having a boom movable over a relatively large land area and including an elongated pipe receiving water for discharge through a plurality of sprinkler heads, a plurality of support assemblies for the boom, each support assembly including an elongated frame member generally in perpendicular relation to the boom, a wheel journalled at each end of the elongated frame member for engaging the ground surface, a drive motor, that improvement comprising a worm drive connection between the drive motor and a ground-engaging wheel to provide positive drive for the wheel and prevent free-wheeling of the wheel when traversing a downgrade, said worm drive connection including a worm wheel connected with the ground-engaging wheel, and a worm pinion meshing with the worm wheel and drivingly connected with the motor, and means disengaging the drive connection between the drive motor and [ground-engaging wheel] *worm pinion* to enable towing of the boom when moving the irrigation system from one area to another.

*8. The structure as defined in claim 7 wherein each of said wheels includes a supporting member defining an axis of rotation for the wheel, and means mounting the supporting member from the frame member for pivotal movement between a boom towing position in which the axis of rotation is perpendicular to the boom and a position in which the axis is parallel to the boom for movement of the boom in a circular path, and means releasably securing said supporting member in both positions.*

*9. The structure as defined in claim 7 wherein said supporting member includes a housing for the worm drive connection, and means securing the housing to the frame member for orientation in both positions.*

*10. In an irrigation system, an elongated water distribution pipe, a plurality of support means supportnig said pipe, each of said support means comprising an elongated, horizontally disposed frame means which is disposed transversely to the longitudinal axis of said pipe, a wheel assembly at each end of said frame means, power means including a drive shaft drivingly connected to at least one of said wheel assemblies, the rotational axis of each of said wheel assemblies being generally parallel to the longitudinal axis of said pipe when distributing water, and means for selectively pivoting said wheel assemblies with respect to the frame means to a tow position so that the rotational axis of each of said wheel assemblies will be transversely disposed with respect to the longitudinal axis of said pipe to permit said pipe and said support means to be towed, said driven wheel assembly comprising a drive wheel, a gear housing having gear means therein connected with a positive drive output member, said drive wheel being mounted on said output member for rotation therewith, and means for disengaging the drive shaft from the gear means so that said drive wheel may freely rotate when said wheel assembly has been pivoted to said tow position.*

*11. The structure as defined in claim 10 wherein said gear housing includes a plate disposed horizontally thereon, said frame means including a plate disposed horizontally thereon, said means for selectively pivoting said wheel assemblies includes pivot bolt means extending through said plates, and lug means interengaging said plates to retain the plates in two perpendicular positions about the pivot bolt for retaining the wheel assemblies in water distributing position and tow position.*

* * * * *